March 1, 1955  C. B. CURTISS  2,703,220
POWER-OPERATED WINCH

Filed July 31, 1948  7 Sheets-Sheet 1

INVENTOR.
Charles B. Curtiss
BY
Frank C. Karman
ATTORNEY

March 1, 1955

C. B. CURTISS 2,703,220

POWER-OPERATED WINCH

Filed July 31, 1948

INVENTOR.
Charles B. Curtiss.
BY
Frank C. Fearman.
ATTORNEY

March 1, 1955
C. B. CURTISS
2,703,220
POWER-OPERATED WINCH
Filed July 31, 1948
7 Sheets-Sheet 4
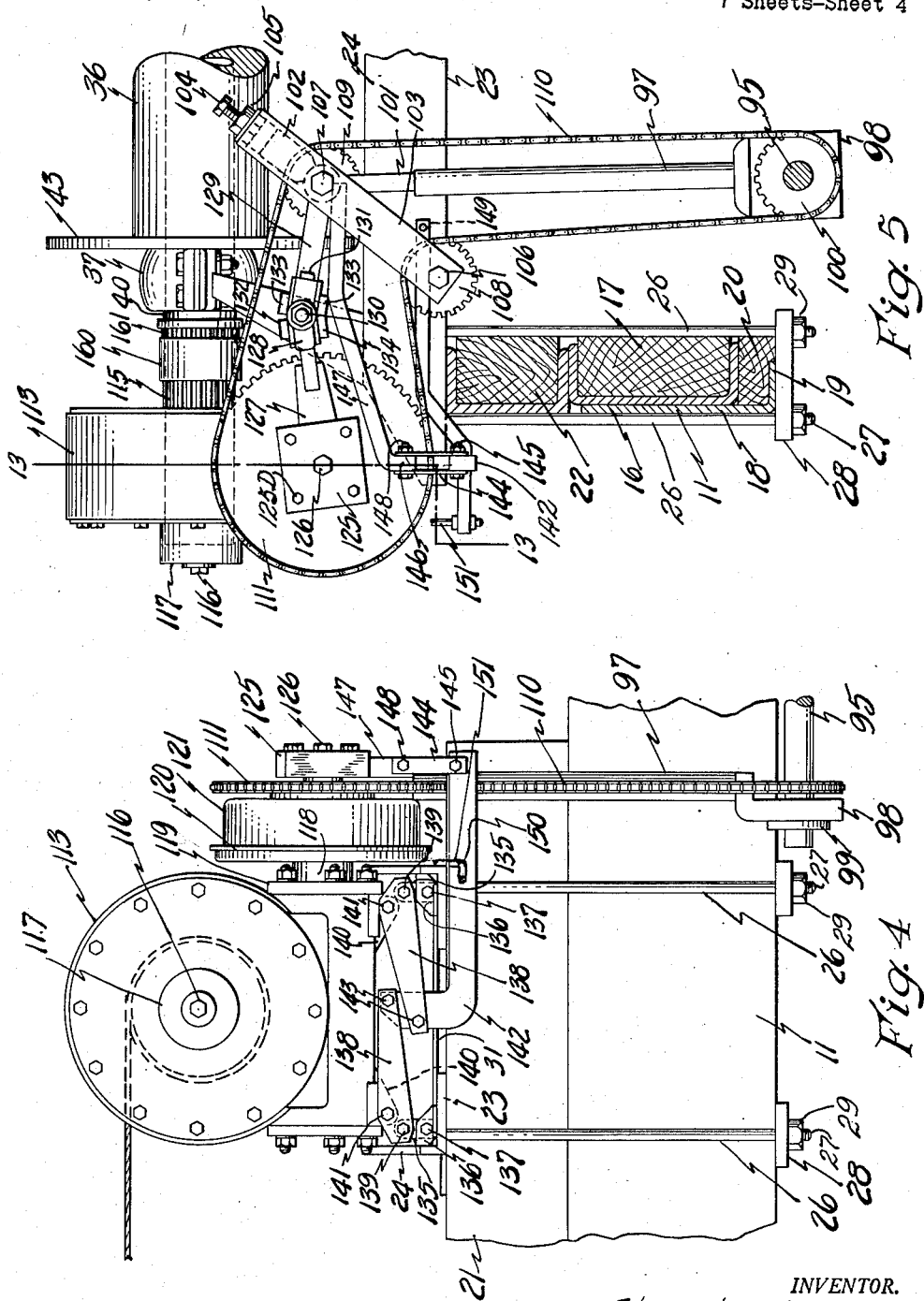
INVENTOR.
Charles B. Curtiss,
BY
Frank C. Fearman
ATTORNEY March 1, 1955
C. B. CURTISS
2,703,220
POWER-OPERATED WINCH
Filed July 31, 1948
7 Sheets-Sheet 5
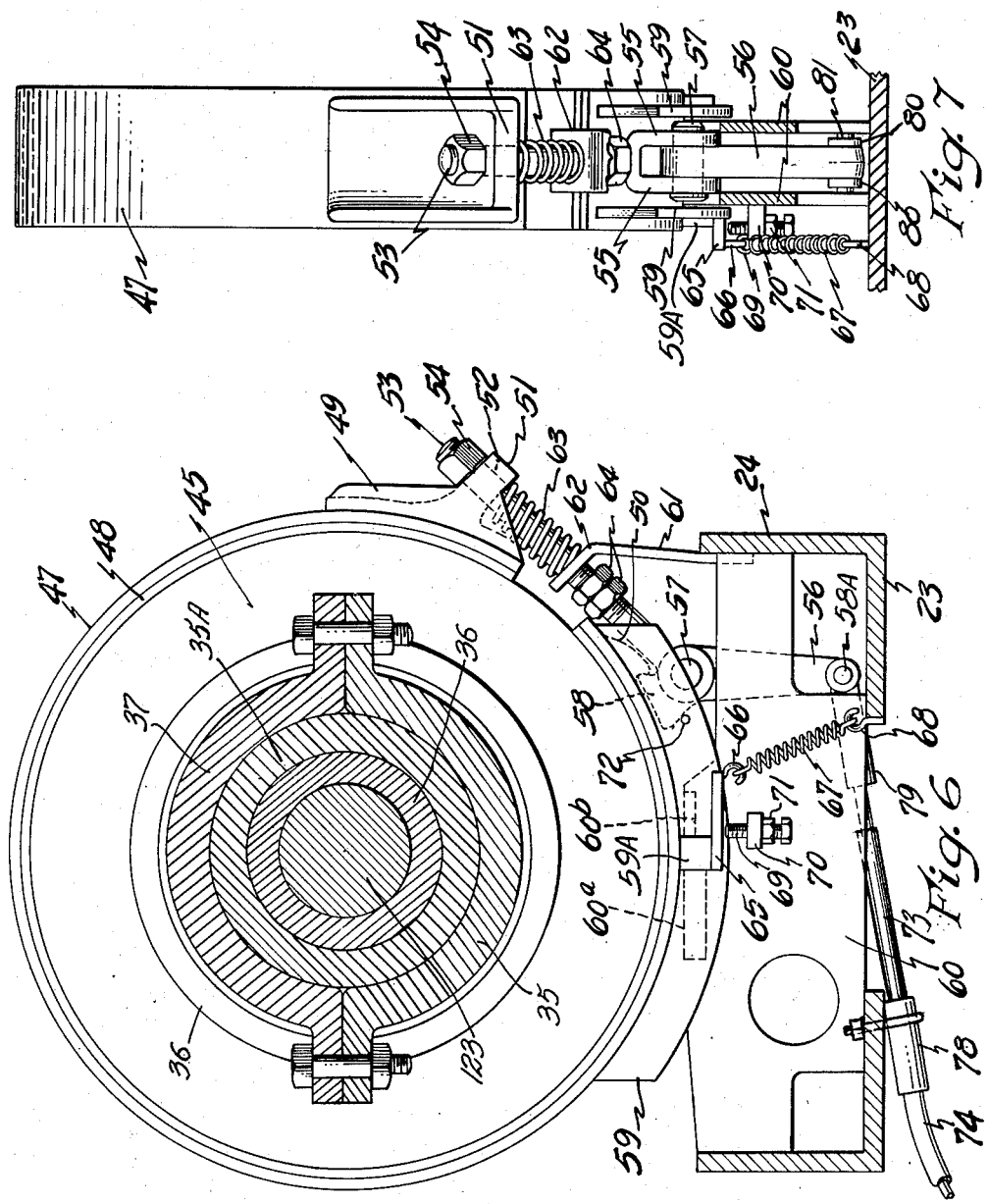
INVENTOR.
Charles B. Curtiss.
BY
Frank C. Farman
ATTORNEY March 1, 1955

C. B. CURTISS 2,703,220

POWER-OPERATED WINCH

Filed July 31, 1948

INVENTOR.
Charles B. Curtiss.
BY
Frank C. Fearman.
ATTORNEY

March 1, 1955
C. B. CURTISS
2,703,220
POWER-OPERATED WINCH
Filed July 31, 1948
7 Sheets-Sheet 7
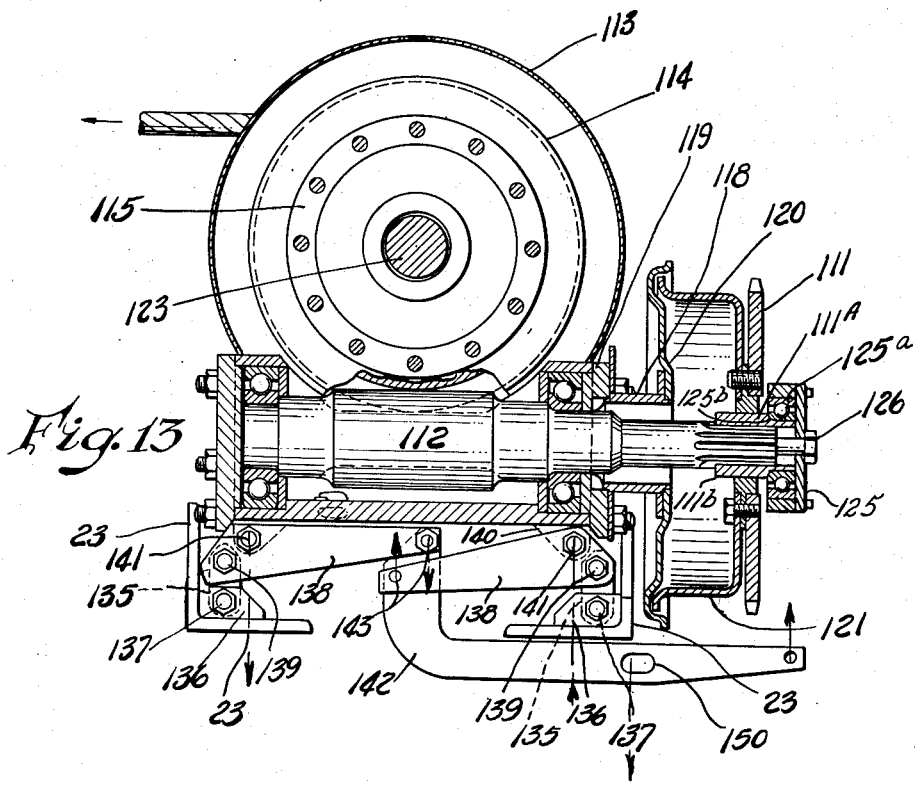
INVENTOR.
Charles B. Curtiss
BY
Frank C. Fearman.
ATTORNEY United States Patent Office 2,703,220
Patented Mar. 1, 1955

2,703,220

POWER-OPERATED WINCH

Charles B. Curtiss, Bay City, Mich.

Application July 31, 1948, Serial No. 41,750

6 Claims. (Cl. 254—166)

The present invention relates to power operated winches and cable hoisting mechanisms, and in particular to a winch structure for motor trucks and vehicles.

The primary object of the invention is to provide a winch structure for motor trucks and other vehicles which is of light weight construction without sacrificing strength to resist the loads ordinarily encountered in winch structures of this type.

Another object is to provide a winch structure for motor trucks and other vehicles which is accident-proof and which can be operated from suitable controls positioned adjacent the driver's seat of the vehicle or motor truck with reasonable safety and facility.

Another object is to provide a winch structure for motor trucks and other vehicles which is provided with a base having sloping end frames mounted on a base and extending toward a common vertex point so that compression and tension stresses and strains at the winch support will be better resisted when the winch or cable drum is under load.

Another object is to provide a winch structure in which the lower portions of the end frames are located adjacent the chassis members of the motor truck or vehicle to resist stresses and strains applied to the truck chassis by the imposed horizontal couple caused by the rope pull and opposed by suitable means to prevent the movement of the winch to the rear, which imposed couple is balanced by the vertical couple caused by the front bolts which are in tension, and the rear support on the chassis.

Another object is to provide a winch structure for motor trucks and other vehicles with a drive-released brake adapted to allow the winch cable drum to be driven in either direction of rotation without brake drag and to be held against rotation when the drive is released.

Another object is to provide a winch structure with a drive-released brake, the braking force of which is proportionate to the working load torque of the cable drum.

Another object is to provide a winch structure for motor trucks and vehicles having a worm and worm wheel drive, the driving couple of the worm case being used to apply the brake proportionate to the working torque, the braking force applied being proportionate to the load on the winch drum and sufficient to hold that load.

Other objects and advantages of the invention will become apparent during the course of the following description of the accompanying drawings wherein:

Figure 4 is an end-elevational view of the worm and worm wheel housing for the winch showing the manner in which the gear housing is supported and connected to the drive-released brake lever.

Figure 5 is a fragmentary, front-elevational view of the winch structure showing the drive-released brake operating means with the brake in its off position for driving the cable drum of the winch.

Figure 2:
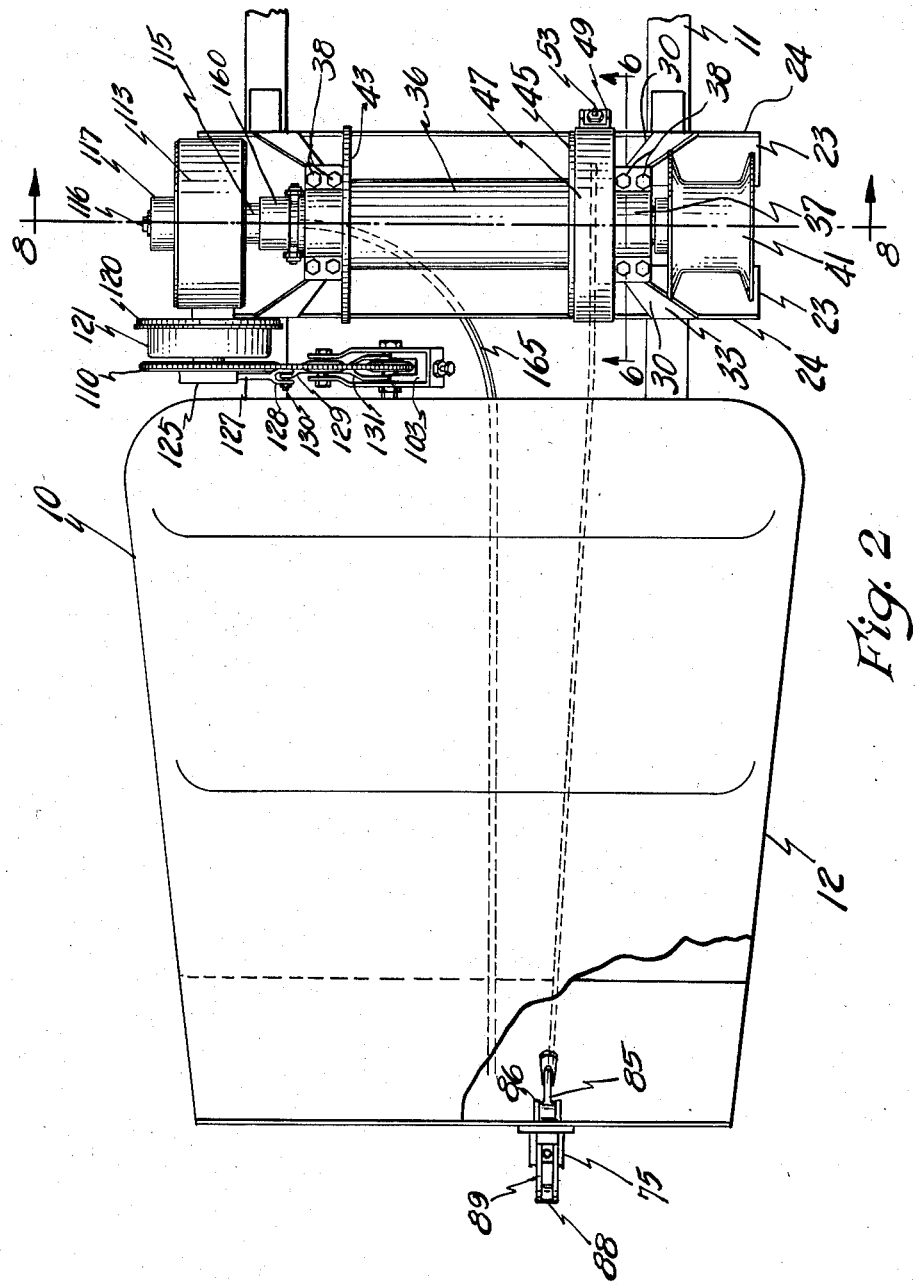
Figure 2 is a top-elevational view of the winch showing the angular arrangement of the supporting end plates and illustrating the drive-released brake operating mechanism.

Figure 6 is a vertical, cross-sectional view taken on line 6—6 of Figure 2 showing the manually controlled cable drum brake and illustrating the flexible push-pull control cable connections therewith; and, Figure 7 is an edge-elevational view of the manually controlled brake showing portions of the winch base broken away and in section to illustrate the linkage connections between the brake drum and the operation thereof.

Figure 8:
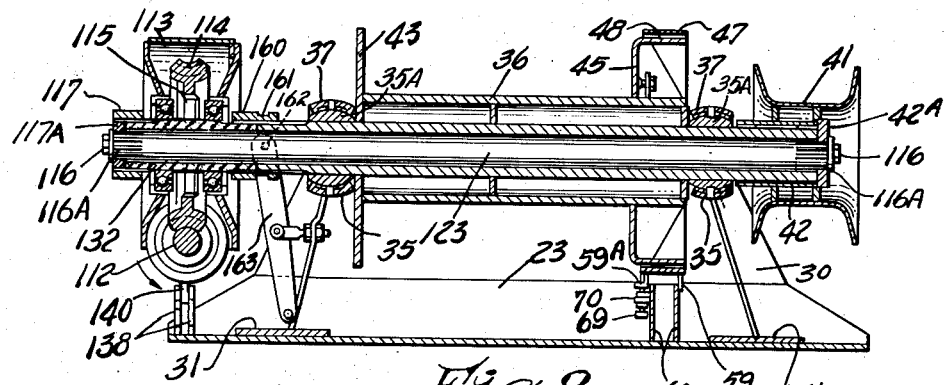

Figure 8 is a vertical, sectional view taken on the line 8—8 of Fig. 2 with the sliding clutch in engaged position.

Figure 9:
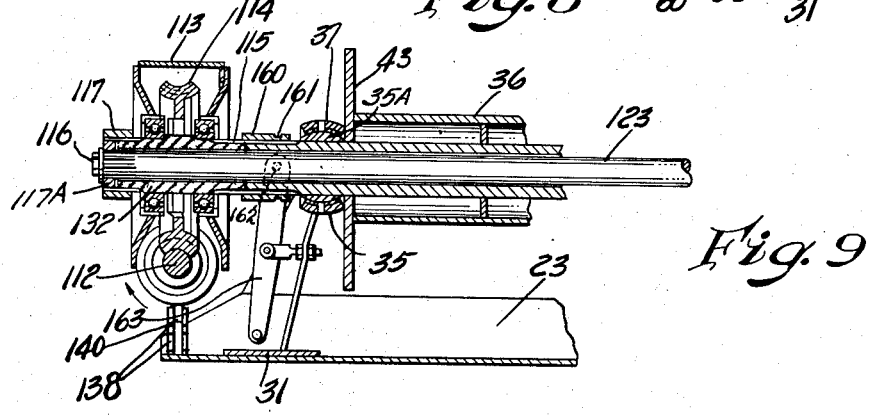

Figure 9 is a fragmentary, sectional view similar to Fig. 8 showing the sliding clutch in disengaged position.

Figure 10:
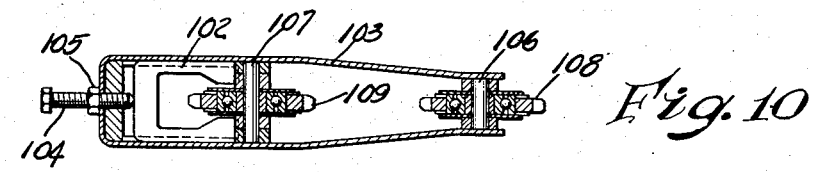

Figure 10 is a sectional right, side elevation through the center of the lower idler support, the upper sprocket being shown in its highest position.

Figure 11:
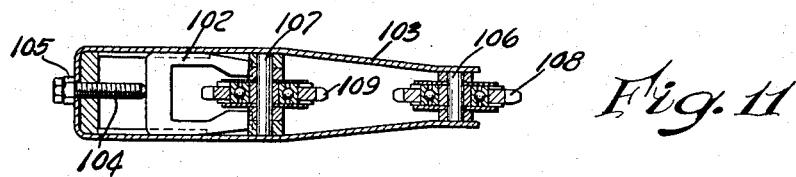

Figure 11 is a sectional, right side-elevational view similar to Fig. 10, the upper sprocket being shown in its lowest position.

Figure 12:
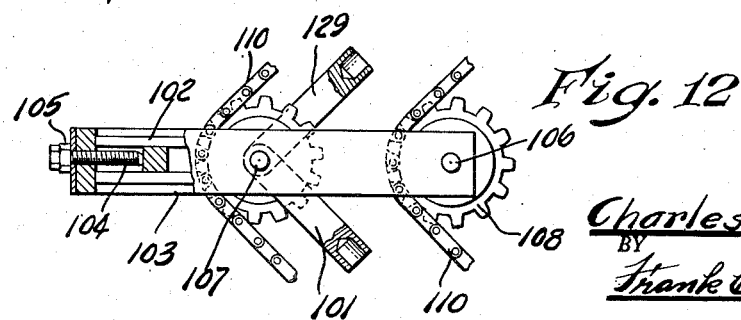

Figure 12 is a partial, side view showing the guiding strips for the yoke.

Figure 13 is a sectional, elevational view taken on the line 13—13 of Fig. 5, showing the relationship of the worm, automatic brake anchor support, brake anchor plate, driving sprocket, brake drum and brake release bearing block and the actuating lever.

In the drawings, and in detail, there is shown for the purpose of convenience of illustration, a motor truck or traction vehicle generally designated 10, (Fig. 11), having a pair of chassis members 11, a driver's cab 12 and steering wheel 13, the driver being accommodated by a seat 14. The usual internal combustion engine (not shown) is provided for the motor truck and a power take-off shaft 15A is connected therewith to be driven by said engine through the usual transmission with power take-off 15.

The chassis frame 11 is constructed of side frame members 16 of channel section provided with wood filler blocks 17, and welded or otherwise attached to the channel side frame members 16 is a reinforcing plate 18 of angle section having its flanged edge extending inwardly as at 19. A wood filler and reinforcing block 20 is interposed between each of the internal flanges 19 and the lower flange of the channel members to add rigidity to the chassis frame structure and to prevent the bending of the flanges when tightening the winch bolts.

Supported on each of the chassis members 11 is a sill beam 21 likewise of channel section, and provided with reinforcing wood filler blocks 22 arranged in the channels thereof. The sill members 21 are adapted to support a pair of transversely arranged, spaced-apart pressed steel winch base members 23 which are of angle section with their flanged edges 24 arranged in opposed relation. The end portions of the flanges 24 are angled as at 25 to present a finished appearance.

Figure 3:
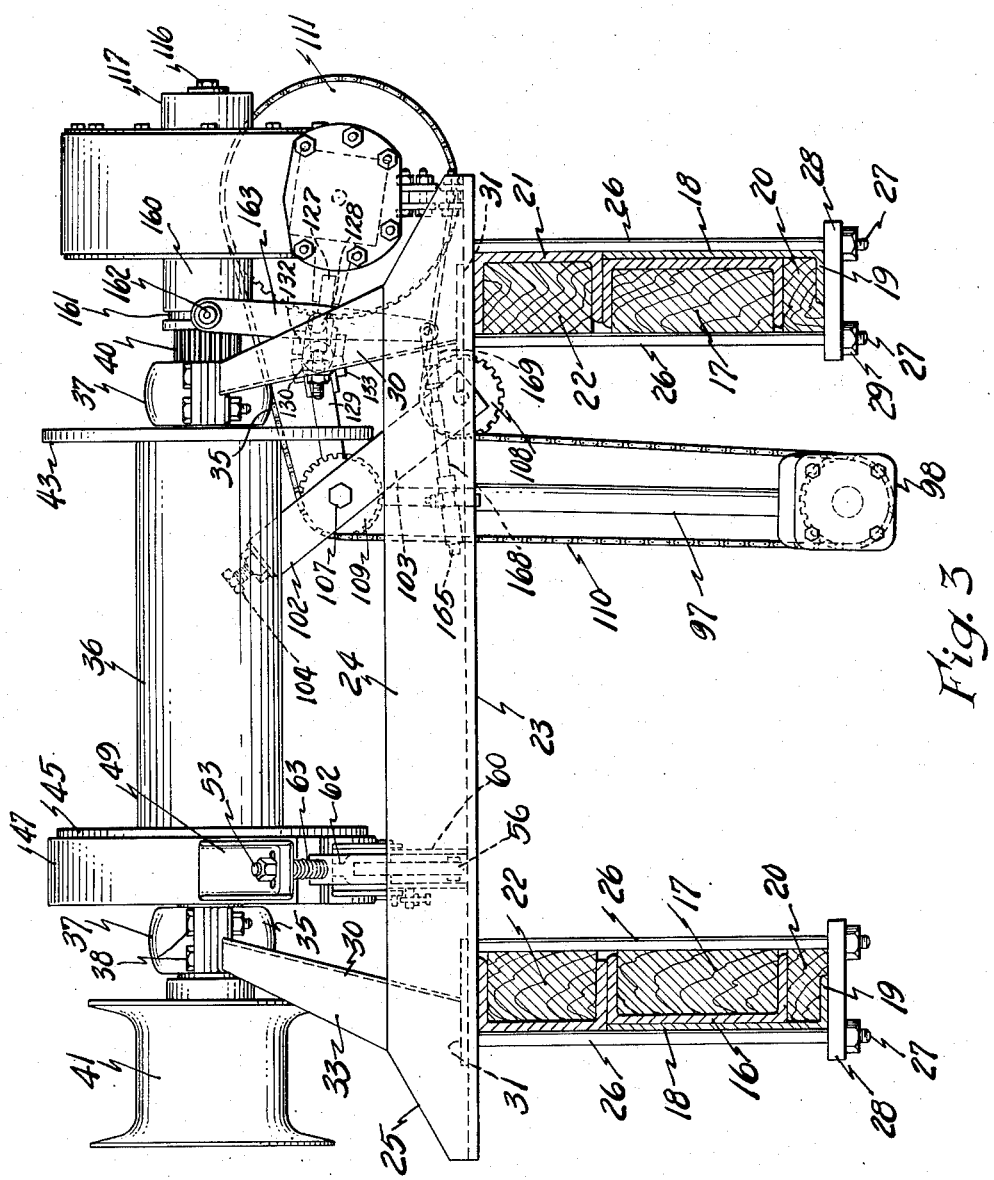
Figure 3 is a rear-elevational view of the winch structure showing the manner in which the supporting base is anchored to the chassis and sill members of the vehicle which are illustrated in section to show the various structural details of the anchoring bolts, the angular position of the end plates also being shown, as well as their relation and position with respect to the chassis frame members.

Each of the angle base members 23 is provided adjacent its ends with a pair of spaced anchoring rods 26, having threaded free ends 27. Each pair of anchor rods 26 is adapted to straddle the chassis and sill members 11 and 21 respectively in order that a hold-down plate 28 can be placed in position as shown in Figure 3. Hold-down nuts 29 on the threaded ends of the anchor rods 26 are adapted to securely clamp the winch base members 23 to the chassis and sill members.

Mounted between the base members 23 adjacent each end thereof and directly above the chassis and sill members 11 and 21 are plate end brackets 30 which are inclined upwardly and inwardly toward a common vertex point. The plate end brackets 30 are welded to plates 31 which are securely welded to the base angles 23 to carry the end bracket loads to the base angles. Openings 34 may be formed in the inclined end brackets 30 to decrease the weight thereof, and to improve accessibility to the operating mechanism.

The upper edges of the inclined end brackets 30 are provided with spherical bearing seats 35 for rotatably supporting a winch drum 36. The drum 36 has its end portions 40 reduced in diameter to journal in the aspherical bushings 35A, and spherical bearing caps 37 are bolted to the seats 35 by bolts 38 to retain the bushings 35A and the drum 36 in position. The reduced ends 40 of the drum 36, which are hollow to accommodate the winch main shaft 123, extend a considerable distance beyond the spherical bearing members 35 and 37, and one end of said reduced ends supports a nigger-head 41, while the other end is provided with means to engage the worm wheel center 115 for imparting rotary motion to the cable drum shaft.

The cable drum 36 is provided with a rope guide flange 43 at one end and a brake drum 45 near the other end. The brake structure comprises a brake drum 45 (Fig. 6), fixed to one of the ends of the cable drum 36 and said brake drum is encircled by a flexible brake band 47 having a friction brake lining 48. The brake band 47 is split and has affixed to the ends thereof brake band lugs 49 and 50. Formed integral with the lug 49 is an ear 51 having an opening 52 for receiving a bolt 53, one end of which is threaded for receiving a correspondingly threaded nut 54.

The opposite end of the bolt 53 is bifurcated to provide a clevis 55 for rockably supporting an operating lever 56 on a floating pin 57. One end of the operating lever 56 is provided with a hook-shaped extension 58 adapted to seat in a groove of the brake band lug 50 to act as a fulcrum, so that when the operating lever 56 is rocked about its pivot 57 the brake band will be contracted.

Depending from the lower peripheral surface of the brake band 47 is a pair of spaced circumferentially extending flanges 59 which extend downwardly on each side of a pair of anchor supporting bars 60 having their ends welded or otherwise affixed to the angle base member 23. The anchor supporting bars 60 are perforated to reduce the weight of the winch structure, and are so arranged as to retain the brake band 47 in position and prevent axial movement thereof.

Extending upwardly from the outstanding flange 24 of one of the base members 23 is a brake release bracket 61 having an angular end portion 62 and an opening for receiving the operating bolt 53. A coil spring 63 has one end in abutting engagement with the ear 51 and its opposite end abutting the angular portion 62 of the bracket 61. Thus, the brake band 47 is yieldingly held away from the brake drum when the brake is off. The nuts 64 limit the opening of the portion of the brake bank beyond the brake release bracket 61, and when the nut 64 contacts the angular portion 62 of bracket 61, further motion by the brake band operating lever 56 will cause the extended portion 58 to press against the brake band stop pin 72, because the brake band floating pin 57 in the end of the brake band bolt 53 is being held by the nut 64. The pin 72 will therefore cause the lower portion of the brake band to release, and the spring 67 will hold it away from the winch brake drum 45. The anchor 59A for the brake band 47 which prevents brake band rotation when the brake is applied, is a square bar welded between the flanges 59 and abutting against the two bars 60ª and 60ᵇ welded between the anchor supporting bars 60.

A projection 65 is stuck out of one of the depending flanges 59 and is provided with a hook 66 to which is affixed one end of a coil spring 67. The other end of the spring is attached to a similar hook 68 affixed to one of the opposed flanges 23 of the winch base. This spring draws the brake band 47 away from the brake drum 45 to prevent any drag when the brake is off.

An adjustment screw 69 is threaded in a projection 70 on one of the anchor bars 60 and has its end presented to the projection 65 to adjust the release clearance of the brake band relative to the drum 45. The adjustment screw 69 is provided with a lock nut 71 to retain the screw in a pre-set position. Extending between the depending flanges 59 of the brake band 47 is a stop pin 72 to prevent the disengagement of the mutually hooked surfaces of the lug 50 and said extendion 58.

The drum assembly with worm case is readily removable as a unit. It is only necessary to back off the nut 54 to release spring 63, unhook the spring 67, remove pin 58A, and the bearing caps and pins 141, and then the entire drum assembly can be lifted free.

The brake operating lever 56 is controlled from a position adjacent the driver's seat 14 by a flexible shaft 73 housed in a flexible sheath or tube 74 which extends from the manual winch brake to a lever bank bracket 75 supported on the dashboard 77. Each end of the flexible tube 74 is provided with a collar 78, one of which is attached to one of the winch base members 23, while the oposite collar is attached to the lever bank bracket 75.

To each end of the cable is attached a rigid member which moves axially to transmit the motion imparted to one end of the mechanism to be actuated at the other end; the sheath or tube supports the cable and prevents side motion of the cable. If the installation is in a straight line, the sheath merely guides the cable, but if the installation includes a bend in its length, the sheath will prevent side motion, not merely within the sheath, but because of an end stress in the sheath which keeps the combination from twisting or straightening. If the cable is in tension and the tension pull leads around a corner, it will contact the inside of the sheath, and will tend to draw it toward the center of the curvature; it must be designed to take this compression. If the cable is in compression, it will tend to make the sheath pull away from the center of the curvature, and will then put the sheath in tension; for this reason, the sheath must be anchored securely at each end. Thus, the sheath always will have a force substantially equal to and opposite to the load in the inner cable, a push or compression if the cable has a pull, and vice versa. It is for this reason these controls are termed "push-pull" units.

Figure 1:
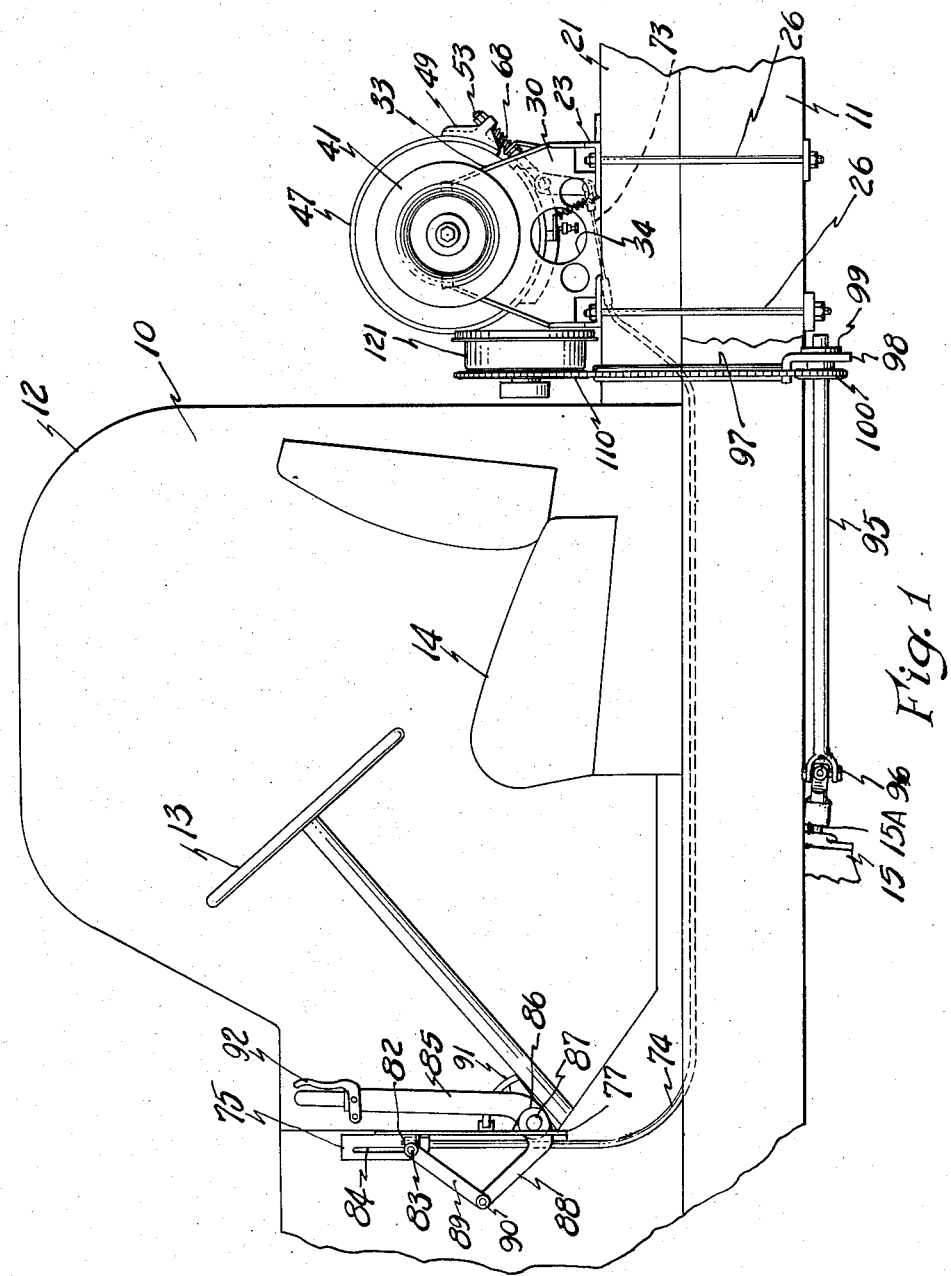
Figure 1 is a fragmentary, side-elevational view of a motor truck or traction vehicle showing the manner in which the winch is mounted thereon and the location of the manual brake and clutch control levers, the winch being shown in end-elevation.

One end of the flexible cable 73 is fitted with a clevis 79 having a clevis end to provide spaced-apart arms 80 (Fig. 7), which straddle the lower end of the brake operating lever 56 being pivotally connected thereto by means of a clevis pin 81. The opposite end of the flexible cable 73 is attached to a slide 82 (see Fig. 1) having a pin 83 operating in a slot 84 in the lever bank bracket 75. A manual control lever 85 is pivotally mounted on a pivot pin 87 between a pair of spaced-apart bearing ears 86 on the lever bank bracket 75, which in turn is supported on the dashboard 77 (Fig. 1). An extension 88 is formed integral with the manual control lever 85 and projects through an opening in the dashboard frame structure 77 for being connected with the pin 83 by means of toggle links 89 having one end pivotally connected to the control lever extension 88 by a pivot pin as at 90, while the opposite ends are pivotally mounted on the pin 83. The manual control lever 85 is held in any desired position by means of a sector locking plate 91 supported on the dashboard frame structure 77 and engaged by a detent rod (not shown) controlled by the lever grip 92.

In order to drivingly connect the power take-off shaft 15A to the winch drum 36, a worm drive and sprocket gearing is provided, and included in the sprocket gearing is a drive-released brake mechanism to release the automatic brake when driving the load up or down.

As shown in Figures 1 to 5 inclusive, the power take-off shaft 15A is drivingly coupled to a shaft 95 by means of a universal coupling 96. The free end of the shaft is supported on the lower end of the tubular strut 97 and extends through an offset bearing bracket 98 affixed to the lower end of the support. The sprocket hub 99 is set-screwed to the shaft 95 to locate the sprocket axially on the shaft.

The weight of the shaft 95, strut 97 etc. is carried by a suitable support to the winch base angles 23 or to the hold-down plate 28 in any desired manner. The upper end of the tubular support 97 has mounted thereon a clevis end (bifurcated) 101, which supports hinge pin 107 and which in turn carries sprocket 109 and connects the vertical support 97 to the horizontal clevis 129 of the articulated strut 128—129. A U-shaped yoke 102 bears on the clevis ends 101 and 129 which are carried by the hinge pin 107. The yoke 102 guided in and lying within the confines of the lower sprocket support 103, slides adjustably by means of an adjusting screw 104 having a lock nut 105, the screw 104 being threaded in the upper end of the lower sprocket support 103. Thus, the relative position of the lower sprocket support 103 carrying with it the lower sprocket 108 with respect to the clevis ends 101 and 129, and the hinge pin 107, can be adjusted to raise and lower the sprocket 108, thus getting the desired chain tightness. Sprockets 108 and 109 are mounted for free rotation, and guide an endless chain 110 for drive from sprocket 100 on the power take-off shaft to sprocket 111 which is mounted on a hub 111A bored and broached to match splines in the end of the winch shaft 123 and fitted upon the winch worm shaft.

A winch main shaft 123 extends through the drum and supports the worm case 113 in line. Mounted on the main shaft is the splined worm wheel center 115 drivingly connected by the broached driving ring 117 to the main shaft. This connects the splined worm wheel center 115 to a ring 117A, the outside splined as shown, the inside being bored and broached to match splines in the end of the winch main shaft 123, thus connecting the worm wheel to the main shaft. The other end of the shaft is similarly splined and drives the niggerhead 41 which is supported by the drum extensions 122 on the bushings 124, through broached thrust washer 42A which is welded to the niggerhead 41. The shaft, by means of the washers 116A and bolts 116, ties the niggerhead to the worm case axially. By holding the case axially in relation to the niggerhead, the rotation of the main worm wheel when driving the niggerhead, holds the units in proper engagement.

The worm case 113 shown in Figs. 8 and 9 is supported in the end brackets independently of the main shaft 123 also supports a drive worm 112 for drivingly engaging a worm gear 114 which is bolted to the worm wheel center 115. One end of the worm projects through the worm case 113 and through a thrust plate 119, which carrier a brake anchor support 118 and brake anchor plate 120. On the end of the worm is a hub 111A driven by the worm on which are concentrically mounted a brake drum 121 and the winch driving sprocket wheel 111. When hoisting, the sprocket drives the winch drum through the gearing, but when the power is disconnected, the worm and worm wheel will tend to reverse, then the hub will be driven by the worm in the reverse direction.

Mounted concentric to the sprocket 111 and fitted over bearing 125A is a bearing block 125, the bearing being interposed between the shouldered section 125B of the splined sleeve 111b and the bearing block 125, said bearing block being held in place by a machine bolt 126 threaded in the end of the worm shaft 112. The bearing block 125 is thus located and held axially on the worm shaft, permitting the sprocket 111 to drive the worm in either direction. A releasing arm 127 (see Figs. 2, 3 and 5) is secured to the block 125, the free end of the arm being forked as at 128, and is connected to a similarly forked end of the arm 129 by means of the pin 130, the opposite end of the arm 129 being mounted on the bolt 107 (see Figs. 3 and 5). The numeral 134 indicates two bars welded across the fork 128, one above and the other below. These bars act as stops, engaging similar bar stops 133 provided on the member 131. These stops are located to allow the desired degree of motion to release the brake when the pin 130 is lifted, said pin being lifted by the compression caused by the chain pull in the articulated arm between 126 and 107. When the chain pull is released, the articulated arm will drop down until the other set of stops limits this motion, allowing the application of the automatic brake by the force set up in the actuating lever 142. This force is applied by the rotating movement of the worm case and is in proportion to the torque load on the case. The force lifting the pin 130 is caused by the fact that the pin is above the line of compression force in articulated member 128—129 between 126 and 107, and will act equally, whether the chain pull is in the portion of the chain that is above or below the sprocket. In other words, the direction of rotation is immaterial, as the chain pull will act to try to bring the centers 126 and 107 together; thus, tension in the chain releases the automatic brake without driving up or down.

The worm casing 113 is mounted for free rotational movement about the axis of the winch drum 36, but is restrained by a linkage system including vertical links 135 pivotally attached to lugs 136 secured to the winch base members 23 as at 137. The upper ends of the links 135 are pivoted to the levers 138 as at 139, and said levers 138 are in turn pivotally connected to ears 140 integrated with the worm casing 113 by pivot pins 141. Each of the levers 138 is pivotally attached to one end of an actuating lever 142 as at 143 (see Fig. 13 of the drawings) so that the tendency for movement of the worm casing 113 in a counter-clockwise direction about the axis of the winch drum 36 will make said actuating lever 142 to tend to lower the free end thereof.

The actuating lever 142 has secured to its free end a pair of links 144 which are held in place by a bolt 145 having a retaining nut, and said links 144 have their upper ends similarly attached to the end 146 of a releasing lever arm 147 by a bolt 148.

This lever arm 147 is attached to the spacing link 129 and moves with the pivotal motion permitted at pin 130. Thus, it will be seen that when a rope or cable load is applied to the winch drum 36, the bearing load between the worm and worm wheel will set up two opposing loads, one at the center line of the worm in one direction, and the other on the center line of the worm wheel in the opposite direction, creating a couple that tends to rotate the supporting worm and worm wheel casing 113.

This rotating couple is transmitted to the supporting linkage above-described, and when the rope tends to rotate worm case 113 in a counter-clockwise direction (Fig. 4), it applies a downward pressure to lever 142 irrespective of the direction of motion of the rope. When power is applied to the drive, the chain will exert a substantial pull which will put the articulating horizontal strut 125—129 in compression, as the pin 130 is above center, the compression force will tend to bring the sprockets 109 and 111 together. It will raise the pin 130 as far as the limiting blocks 132 and 133 will allow, and will carry with it the releasing lever 147 opposing and overcoming the downward force of actuating lever 142, thus lifting the end of 142.

In order to apply the automatic brake on the worm shaft, it is necessary to pull down on the cable 151. The bar 149 is used for this purpose, the inner end being hinged to the base angle 23, the bar extending through opening 150 in the bar 142 and extending out to the line of the brake applying cable at 151. Thus, as the outer end of lever 142 is actuated downwardly by the worm case, the brake will be mechanically and automatically applied in proportion to the intensity of the rope load. When power is applied, however, the lever 147 will raise the outer end of lever 142 and will release the brake when hoisting or lowering, as long as the worm and wheel are reasonably efficient.

As shown in Fig. 9 when broached collar 160 is moved toward the drum, the drive to the drum is disconnected. The drum may be held by the manual brake 47, and the worm drive will then drive the niggerhead 41 only by means of the main shaft 123. The weight of the worm case assembly is carried on the bushing 132 in the splined drum end.

Referring now more particularly to Fig. 13 of the drawing, the rope pull as indicated is opposed by the equal and opposite bearing loads on the end brackets, creating the imposed counter-clockwise torque which must be balanced by the worm case 113. In the worm case, the couple is that caused by the end thrust along the centerline of the worm, as one force, and by the equal and opposite force of the worm wheel on its bearings, minus the vertical couple of the worm bearing loads due to the contact force between the worm and wheel not being on the centerline of the worm. The net worm case couple equals the imposed couple, and it in turn is balanced by the force on the two pins 141 that connect the worm case to the two levers 138. This couple tends to rotate or restrain the worm case, and as the linkage is not rigidly supported, an infinitesmal motion sets up in the vertical links 135 forces balancing most of the worm case couple, the residual torque being balanced by the two forces near the vertical centerline of the worm case, which connect to the L-shaped actuating lever 142. This residual couple tends to rotate the actuating lever 142 in a clockwise direction, due to the fact that the two forces applied by the levers 138 are in each case beyond the vertical centerline of the case. The rotation of the actuating lever 142 provides the vertical pull down at 151 to apply the automatic brake on the worm shaft in proportion to the torque supplied by the worm case. As described, the vertical upward pull of the releasing lever arm 146 (Fig. 5) applied to the end of the actuating bar opposes and overcomes the couple tending to apply the automatic brake, thus releasing that brake when the driving chain 110 is rotating the winch sprocket 111. Correct operation is obtained by proper figuring of the applied and desired loads, and proportioning the linkage accordingly.

A broached sliding clutch collar 160 is movably mounted on the winch drum end 40, and is adapted to drivingly connect the splined worm wheel center 115 to said splined drum end when the clutch collar is moved to the left (Fig. 8). The clutch collar is provided with an annular groove 161 which is engaged by opposed pins 162 on a yoke lever 163. The yoke lever is rockably mounted and is provided with a flexible actuating push-pull cable 165 (Fig. 2) similar to the flexible push-pull cable 74 and operated from a position adjacent the driver's seat, by means of a manual control lever similar to the manual control lever 85. The push-pull cable is attached to a rigid, axially movable rod 168 which is pivoted to the lower end of the yoke lever 163 by means of a clevis 169 (Fig. 3).

For a consideration of the operation of the winch, it will be assumed that the hoisting cable is affixed to the winch drum 36 so as to pay in and out from the upper periphery thereof, and that the drum is to be driven from the power take-off shaft 15A through the medium of the sprocket gearing and worm drive. Also, it will be assumed that the manual brake 47 is released and the clutch collar 160 is positioned to drivingly connect the worm wheel gear in the worm gear casing 113 with the winch drum end 40.

When power is applied by the chain connected sprockets, the pull of the chain will swing the articulated horizontal strut spreader, which will raise the actuating lever 142, causing the automatic brake to release. The linkages are proportioned so that the releasing load more than overcomes the actuating or applying load of the worm case linkage. The brake is thus released for either hoisting or lowering. When the drive is disconnected, the worm case linkage will apply the brake in proportion to the torque load on the worm case, thus locking the worm drive safely and surely.

It is to be understood, that the form of the invention herewith shown and described is to be taken as a preferred embodiment thereof, and that various changes in the shape, size, and arrangement of parts can be resorted to without departing from the spirit of the invention or the scope of the subjoined claims.

What I claim is:

1. In a winch for motor vehicles having a power shaft, a winch structure mounted on said vehicle and including a rotatably mounted drum, a worm drive for said drum, a casing for said worm drive mounted to rock about the axis of said winch drum, a drive-released brake for said worm drive, means drivingly connecting the power shaft of the vehicle with the worm drive, and means responsive to movement of the worm drive casing for applying said drive-released brake means.

2. In a winch for motor vehicles having a power shaft, a winch structure mounted on said vehicle, and including a rotatably mounted drum, a worm drive for said drum, a clutch interposed between said drum and worm drive, a casing for said worm drive, a brake for said worm drive, sprocket gearing drivingly connecting the power shaft to the worm drive, means controlled by the tension in the sprocket chain of the gearing for releasing said drive released brake, and means for applying the braking action of the brake in proportion to the load on the winch drum.

3. In a winch for motor vehicles having a power shaft, a winch drum rotatably mounted on said vehicle, a worm drive for said drum, a gear housing enclosing said worm drive and mounted to rock about the axis of said drum, a drive-released brake for the worm of said drive, sprocket gearing drivingly connecting the power shaft to the worm drive, means controlled by the tension in the sprocket chain of said gearing for releasing said drive-released brake, and means operable by the rocking movement of the worm drive housing for applying the brake in proportion to the load on said winch drum.

4. In a winch for motor vehicles having a power shaft, a winch drum rotatably mounted on said vehicle, a worm drive for said winch drum, a gear housing enclosing said worm drive and mounted to rock about the axis of said drum, a brake for preventing overhauling of said worm drive, sprocket gearing including an endless sprocket chain drivingly connecting the power shaft to the worm drive, means operable upon tensioning said chain to release said brake, and means operable upon rocking movement of said worm drive housing when the drum is loaded to apply said brake in proportion to the load on the drum.

5. In a winch for motor vehicles having a power take-off shaft, a winch drum rotatably mounted on the vehicle, a worm drive for said drum, a sprocket gearing including an endless sprocket chain for drivingly connecting said power take-off shaft to the worm drive, an automatic brake for said worm drive, an actuator member for said brake, a movable frame for supporting said sprocket gearing, and links connecting said movable frame to the brake actuator whereby tensioning and slacking of said sprocket chain will cause said brake to be released and set respectively.

6. In a winch for motor vehicles having a power take-off shaft, a winch drum rotatably mounted on the vehicle, a worm drive for said drum, a worm gear housing mounted for angular displacement about the axis of said winch drum, sprocket gearing including an endless sprocket chain for drivingly connecting the power shaft to the worm drive, a brake for holding the worm of said drive against reverse rotation, a movable frame for supporting said gearing, a brake actuator for said brake, links connecting said movable frame to the brake actuator, balance linkage connecting the worm gear housing to restrain motion thereof about the axis of said drum, an actuating lever connected to said balance linkage, and means movably connecting said movable frame to the actuating lever to release said brake when power is applied for hoisting or lowering.

References Cited in the file of this patent

UNITED STATES PATENTS

| | | |
|---|---|---|
| 1,658,878 | Bird | Feb. 14, 1928 |
| 2,344,795 | Weber | Mar. 21, 1944 |
| 2,411,038 | Hetteen | Nov. 12, 1946 |